United States Patent [19]

Jaffe

[11] Patent Number: 4,478,968
[45] Date of Patent: Oct. 23, 1984

[54] MANUFACTURE OF RESIN EXTENDED PIGMENTS

[75] Inventor: Edward E. Jaffe, Wilmington, Del.

[73] Assignee: Ciba-Geigy Corporation, Ardsley, N.Y.

[21] Appl. No.: 482,596

[22] Filed: Apr. 6, 1983

[51] Int. Cl.$^3$ .......................... C08K 5/34; C08K 5/56; C08J 3/20; C09C 3/10

[52] U.S. Cl. ................................. 524/88; 106/288 Q; 106/308 M; 106/308 Q; 106/309; 524/90; 524/562; 524/563; 524/564; 524/574; 524/581

[58] Field of Search ................... 524/88, 90, 562, 563, 524/574, 581, 564; 106/288 Q, 308 M, 308 Q, 309

[56] References Cited

U.S. PATENT DOCUMENTS

| | | | |
|---|---|---|---|
| 2,539,429 | 1/1951 | Jensen | 106/262 |
| 2,544,636 | 3/1951 | Peck | 260/34.2 |
| 2,649,382 | 8/1953 | Vesce | 106/193 |
| 3,705,816 | 12/1972 | Zwahlen | 106/308 |
| 3,806,464 | 4/1974 | Matrick et al. | 252/316 |
| 3,925,096 | 12/1975 | Karkov | 106/309 |
| 4,158,572 | 6/1979 | Blackburn et al. | 106/309 |
| 4,260,424 | 4/1981 | Mizoguchi et al. | 106/309 |
| 4,369,272 | 1/1983 | Jaffe | 106/309 |
| 4,371,642 | 2/1983 | Jaffe | 524/88 |
| 4,371,643 | 2/1983 | Thomas | 524/88 |
| 4,404,036 | 9/1983 | Donegan | 106/309 |

FOREIGN PATENT DOCUMENTS

| | | |
|---|---|---|
| 554960 | 3/1958 | Canada . |
| 895751 | 5/1962 | United Kingdom . |
| 1431636 | 4/1976 | United Kingdom . |
| 2046770 | 11/1980 | United Kingdom . |
| 2051108 | 1/1981 | United Kingdom . |

Primary Examiner—Herbert J. Lilling
Attorney, Agent, or Firm—Harry Falber

[57] ABSTRACT

A process for preparing a resin extended pigment from crude pigment is disclosed. The process involves dry premilling the crude pigment either with or without the resin followed by comilling the premilled pigment with the resin in the presence of water under alkaline conditions. Preferably an organic liquid which wets the resin and the pigment and can improve the crystallinity of the pigment is present in the water milling step.

20 Claims, No Drawings

MANUFACTURE OF RESIN EXTENDED PIGMENTS

BACKGROUND OF THE INVENTION

1. Field of the Invention

The present invention relates to a process for the production of resin extended pigments which exhibit improved dispersiblity over the corresponding nonresin extended pigment in a variety of plastics applications.

Pigments are widely used in various types of polymeric media. The efficiency of a pigment as a color imparting substance is very dependent on the degree of pigment dispersion achieved in these media. Generally pigments are products having a very small particle size with a consequent tendency to form aggregates during their preparation. This tendency to form aggregates is particularly troublesome during the drying step used in the preparation of pigments. In order to overcome this tendency to form aggregates various methods have been used to prevent or minimize the formation of aggregates and thus enhance dispersibility of the pigment involved.

2. Prior Art

U.S. Pat. No. 2,539,429 discloses comilling a pigment and a water insoluble resin in the presence of a water miscible solvent for the resin. The solvent is then removed with water.

U.S. Pat. No. 2,544,636 discloses comilling a pigment and a resin in the presence of a solvent for the resin to produce a free flowing pigment base.

U.S. Pat. No. 2,649,382 discloses a process wherein a pigment and a soluble resin are comilled with a mixture of water and a water miscible solvent for the resin.

U.S. Pat. No. 3,705,816 discloses grinding a pigment, a cellulose ester and a water miscible organic solvent for the cellulose ester.

U.S. Pat. No. 3,806,464 discloses a process for preparing a pigment encapsulated with an acrylic interpolymer by comilling the pigment, the acrylic interpolymer and a solvent for the acrylic interpolymer. After the comilling step, the solvent is removed.

U.S. Pat. No. 3,925,096 discloses a process for producing a particulate resin-containing pigment composition in which an organic solvent soluble resin and pigment are comilled in the presence of an organic solvent.

British Patent No. 895,751 discloses a process for forming a pigment preparation wherein a pigment is milled with a solution of a polymerization or polycondensation product followed by precipitation of the polymerization or polycondensation product.

British Patent No. 1,431,636 discloses ball milling a pigment with a solution of a polyesterpolyurethane to form a pigment paste.

Canadian Patent No. 554,960 discloses milling a pigment and a plastic in the presence of water, a water miscible solvent for the plastic and a water immiscible solvent for the plastic.

SUMMARY OF THE INVENTION

In the process of the present invention a resin extended pigment having improved dispersibility and having the pigment particles reduced to pigmentary size is prepared by dry ball milling the crude pigment followed by milling the resulting material, i.e., mill powder, with a resin in an aqueous base, basified aqueous salt solution or basic salt solution, such as $Na_2HPO_4$ or $Na_3PO_4$ in the presence of a small amount of an organic liquid at least some of which is present as a separate phase in the aqueous milling step. In another aspect of the invention, the crude pigment is dry ball milled with a resin and is subsequently milled in an aqueous base, basified aqueous salt solution or basic salt solution; preferably in the presence of a small amount of a organic liquid at least some of which is present as a separate phase but this is not necessary for certain uses such as when the resin extended pigment is to be used in polyvinyl chloride. The organic liquid serves to wet the pigment and resin and generally improves the crystallinity of the pigment.

DETAILED DESCRIPTION

The present invention is a process for the production of resin extended pigments of improved dispersibility, which process is characterized by requiring no additional steps beyond those already employed in the process of particle size reduction for a given pigment. The desired resin is simply incorporated with the pigment in a dry premilling particle size reduction step, which is then followed with a milling step in basified water or dilute aqueous basic salt solution optionally with a small amount of an organic liquid at least some of which is present as a separate phase during which the low crystallinity, aggregated form of the pigment, resulting from premilling, is converted to a readily dispersible resin extended pigment. Alternatively, the crude pigment only can be premilled to an aggregated, low crystallinity form and the resin added to the subsequent aqueous milling step in the presence of a small amount of organic liquid at least some of which is present as a distinct separate phase. The latter approach is sometimes preferred for reasons of convenience since cleanout of solvent or liquid mills is easier than premills which involve the handling of solids only. Generally the low crystallinity pigment is milled in aqueous base, basified aqueous salt solution or basic salt solution at pH 7–14, preferably pH 9–13.5.

If the pigment is premilled in the presence of a resin and an intimate mixture is obtained, further milling in aqueous base is sufficient to obtain a product of excellent dispersibility characteristics in some systems such as polyvinyl chloride. But for broad plastics application, particularly polyethylene, the organic liquid should be present in the aqueous milling step. If the pigment is premilled by itself and the subsequent shot milling step is carried out in the presence of resin, water and a small amount of the organic liquid, as defined herein, a highly satisfactory product is obtained. If the organic liquid is soluble in water at a given concentration, a higher concentration of base or the addition of a salt to the aqueous base can be used to force the solvent out of solution which results in greater wetting of the pigment and resin and greater potential for particle growth.

For instance when preparing a resin extended, violet, beta-quinacridone and using a preferred solvent, i.e., n-pentanol, which ordinarily is moderately soluble in water at room temperature (at 22° C. n-pentanol dissolves to a solution of 2.7%), the addition of an appropriate amount of base, base and salt, or basic salt can force the alcohol out of the solution and thereby render it an effective wetting and growth medium for the pigment. The higher the ionic strength of the aqueous phase, the more alcohol is forced out of solution. Thus, in 100 ml of 3.7% aqueous sodium hydroxide containing 1.2 g sodium sulfate, 41% of 2 ml of n-pentanol is out of solution. If the amount of sodium hydroxide in a similar sodium sulfate solution is about doubled to a concentration of 7.3%, 68% of the alcohol is out of solution. In the latter case, more alcohol is available for wetting and particle growth purposes. As the amount of alcohol is increased, a greater percentage of it is out of solution at a constant ionic strength.

Thus, when milling 13.2 g beta-quinacridone mill powder containing 12 g beta-quinacridone and 1.2 g sodium sulfate with 95 ml of water, 7.7 g 50% aqueous sodium hydroxide, 8 g of a copolymer consisting of 95% by weight ethylene and 5% by weight acrylic acid and 2 ml (1.63 g) of n-pentanol; a product of outstanding dispersibility in polyvinyl chloride is obtained. If the experiment is repeated in an identical manner, but the n-pentanol is left out; a product of significantly inferior dispersibility is obtained. Inclusion in the milling of only 1 g 50% aqueous sodium hydroxide and 99 ml water, instead of 7.7 g and 95 ml base and water respectively, shown in the previous experiment leads to products of similar poor strength development whether n-pentanol is added or not. In this case the ionic strength is not sufficient to force enough n-pentanol out of solution; consequently, its presence does not significantly affect the dispersibility of the product. In a similar experiment in which a 75/25 quinacridone/2,9-dimethylquinacridone solid solution is prepared from premilled powder using 132 g of the powder (containing 10% sodium sulfate), 950 ml water, 77 g 50% aqueous sodium hydroxide and 80 g copolymer as well as 20 ml n-pentanol, gave a product of outstanding dispersibility in polyvinyl chloride. When the experiment is repeated, but the n-pentanol is left out; a product of poor dispersibility results. On the other hand, comilling of the required amount of quinacridone, 2,9-dimethylquinacridone and resin (37.5 g quinacridone, 12.5 g 2,9-dimethylquinacridone, 33.3 g copolymer and 8 g sodium sulfate) followed by milling in dilute aqueous base produces a blue shade red solid solution of excellent dispersibility in polyvinyl chloride. It is noteworthy, however, that the product prepared in the presence of the organic solvent, is desirably yellower and more intense.

Similarly, comilling 30 g quinacridone, 20 g 4,11-dichloroquinacridone, 33.3 g copolymer and 8 g sodium sulfate, followed by milling in dilute aqueous base, produced a scarlet resin extended pigment of outstanding dispersibility in polyvinyl chloride. When the two quinacridone components of the solid solution are premilled and the resulting mill powder is then milled in dilute aqueous base in the presence of resin and n-pentanol, a product of excellent dispersibility results, which shows a significant shift in color to shorter wavelength indicating a better solid solution and larger particle size. In the absence of alcohol, a product of poor dispersibility results. Many other pigments, including quinacridones and copper phthalocyanines, extended with resin, of excellent plastics dispersibility, can be prepared by these procedures.

The products are highly dispersible quinacridone or copper phthalocyanine pigments which are essentially equal in dispersibility and pigmentary strength to commercial resin extended pigments, which have been resin extended in a separate step after having their particle size reduced to pigmentary size.

The relative proportions of pigment and resin may vary widely depending on the intended use of the resin extended pigment. As little as 10% by weight resin, based on the resin extended pigment, has shown a distinct beneficial effect for some pigments in some plastic systems. For the solid solution of 90% 2,9-dimethylquinacridone and 10% quinacridone, extension with 25% by weight resin, has given a product of vastly improved dispersibility in polyvinyl chloride, over a product containing no resin extension. In the case of a semichlorinated copper phthalocyanine, 50% by weight, based on the resin extended pigment, has shown the greatest effect in terms of dispersibility and compares very favorably with commercial resin extended pigments prepared by more elaborate processes. In terms of convenience and cost, the amount of resin used should be minimized; but the overriding consideration is dispersibility which is maximized in general at a resin extension in the range of 10-75% by weight based on the resin extended pigment and preferably from 25-50% by weight, based on the resin extended pigment.

A wide variety of resins can be used in the process. Generally the resin should not melt during the premilling operation which is carried out at temperatures as high as 65° C. In the aqueous milling step the temperature is usually 20°-50° C. Thus, preferably the resin should have a softening point above 75° C. The resin should be thermoplastic. The resin must be stable in the dilute aqueous acid which is used to remove any metal which becomes incorporated in the resin extended pigment during the milling operation. Adequate stability in dilute acid means that the resin does not undergo significant deleterious degradation when subjected to about a 1.5% solution of sulfuric acid at 90° C. for 2 hours. Any of a wide variety of resins can be used. The resin should be in a finely divided state such as a powder rather than being in the form of molding pellets.

The preferred resins generally are copolymers, such as an ethylene-acrylic acid copolymer, or ethylene homopolymer which are very compatible with many plastic systems.

The most preferred resins are low molecular polymers of ethylene which may contain up to 25% by weight of a monomer selected from the class consisting of acrylic acid, methacrylic acid, vinyl acetate and oxidized ethylene units. These preferred resins have softening points as determined by ASTM E-28 of 80°-140° C.

These resins are essentially insoluble in polar organic liquids and exhibit a solubility in n-pentanol of less than 5 g per liter of solvent and preferably less than 2 g per liter of solvent at 25° C.

Premilling, as used in this invention, means milling in the complete absence of liquids or, if liquids are used, such as a phase directing solvent or a surface-active agent, they are present in such small amounts or of such a nature that the pigment and resin retain the characteristics of a powder.

The conditions applicable to the premilling operation are not especially critical. The mill loading is substantially conventional for ball milling operations. Thus, it is conventional for the charge of grinding media to occupy about half of the volume of the mill and for the material being ground to essentially occupy the voids between these media. It is quite possible to increase the charge with some increase in the milling time. The choice of these conditions is well within the skill of one versed in this type of operation. The preferred grinding media in the mills are the rod type, but these may vary in size, and it is quite possible to use ordinary round steel balls varying from ⅛ inch in diameter up to ½ inch in diameter or more in the operation. The aqueous milling is preferably carried out with ⅛ inch shot and a basic pH, to avoid having acid attack the metal milling media and thus generate hydrogen in the milling operation. However, for water soluble solvent, the ionic strength of the medium determines the amount of alcohol out of solution. Thus, it is possible to substitute part of the base with a neutral salt of similar ionic strength and arrive at a product of similar appearance as judged by tinctorial strength in a plastic system. The aqueous milling can be carried out in the presence of an organic liquid and aqueous base only. The preferred aqueous bases are the alkali metal hydroxides with sodium hydroxide and potassium hydroxide being especially preferred. Alternatively, the aqueous milling can be carried out in a basified aqueous salt solution such as a solution of sodium sulfate or sodium chloride which has been rendered basic by addition of some sodium hydroxide. Alternatively, the aqueous milling can be carried out in a basic salt solution, such as a solution of $Na_2HPO_4$ or $Na_3PO_4$.

Since the n-pentanol is partially soluble in the medium during the milling operation, it appears to act as a solvent medium and also as a dispersant, thereby eliminating the need for surfactants which are usually required for the preparation of pigmentary highly dispersible products. Other solvents such as o-dichlorobenzene or perchloroethylene, which have very low solubility in water, require the introduction of a surfactant to render them effective and thus produce products of good dispersibility in plastics.

It is impossible to set up limits as to the length of the premilling or milling cycle in the presence of an organic liquid since both will vary depending upon the pigment being treated, the milling loading and the type of mill being used. In order to establish the optimum length of time for milling a particular pigment under a given set of conditions, it is recommended that the invention be run with variations in both milling times and loadings, and that samples of the finished product be evaluated for the best balance of properties, such as dispersibility, color strength and intensity. In a commercial scale mill 5-25 hours is usually required for each milling step. The times required in laboratory scale or semi-works are longer.

The preferred method of both premilling and milling in the presence of an organic liquid is ball milling. However, any milling or grinding method which utilized an attrition and shearing action may be used. Such attrition and shearing action may be accomplished in rod mills, stirred and vibratory types of ball mills, and the like.

The preparation of resin extended or resin encapsulated pigment can also be carried out by premilling the pigment and resin in the presence of a small amount of an inorganic salt such as sodium sulfate or alum to suppress potential explosivity of the resulting powder. This is not essential since the powder particles are highly aggregated and not very dusty.

After the premilling step, the resulting mill powder is milled in the presence of basified water, either without or preferably with an organic liquid. This milling is done in the same types of ball mills which were used for the premilling step, but preferably one which uses ⅛ inch shot which occupy about ½ of the total mill volume and provision for temperature control. The liquid used will normally occupy all voids in the mill below the level of the balls or grinding elements within the mill and part of the mill above the level of the balls or grinding elements. A fully loaded mill will be approximately three quarters full.

The premilling step is generally carried out at a temperature of up to 65° C. The step of milling in the presence of an organic liquid can be carried out at from 10°-60° C. with from 20°-50° C. being the preferred range.

Any organic liquid, which is either insoluble in water or can be made to come out of solution to form a separate phase by salting out, and which has effective wetting action on the pigment and resin, and can grow the pigment particles or improve their crystallinity, is acceptable. In addition, the organic liquid should be sufficiently volatile to be removed by steam distillation and be noncorrosive to the mill and grinding elements. A wide variety of organic liquids are suitable which liquids vary with the nature of the pigment and its solubility. Alcohols containing 4-8 carbon atoms such as n-pentanol or cyclohexanol, as well as aliphatic ketones containing 5-8 carbon atoms, such as 2-pentanone, are generally preferred. Chlorinated hydrocarbons such as o-dichlorobenzene or perchloroethylene can be used provided a surfactant is present to provide better contact between pigment and solvent.

The choice of organic liquid will be influenced by the specific pigment that is to be resin extended and the nature of the resin to be used, as well as cost, ease of recovery and hazard of use. Higher boiling liquids are generally more difficult to remove. On the other hand, relatively low boiling liquids, such as n-pentanol, tend to be flammable though low in cost and relatively nontoxic. Generally the organic liquid should exert solvent action sufficient to ripen the pigment particles to pigmentary size or at least improve their crystallinity and wet the resin, but should not exert any excessive solubilizing action on the pigment. n-Pentanol is the solvent of choice.

Generally the organic liquid should not dissolve more than 5 g of the resin being used per liter of solvent at 25° C., and preferably not more than 2 g of resin per liter of solvent at 25° C.

After the milling operations and the solvent steam distillation, the resin extended pigment normally is extracted in a hot aqueous dilute acid, such as about 1.5% sulfuric acid, to remove any metal which has become associated with the resin extended pigment during milling. Following the extraction step, the pigment is dried. In conventional pigment processing, most particle aggregation occurs on drying. In the present process little or no aggregation occurs during the drying step due to the presence of the resin. In the case of the quinacridones, treatment of the product in the extraction step with 2-phthalimidomethylquinacridone improves the heat stability of the pigment. However, the treatment is optional and for a great many applications this treatment is unnecessary.

When extending a pigment with a resin of low polarity, such as polyethylene or polyethylene modified with acrylic acid to produce a product which is useful in plastic systems, the pigment coated by the resin, either in the premilling or subsequent milling operation, to some degree protects the pigment from the effect of the organic liquid. This causes particle growth retardation, the extent of which retardation depends on the nature of the resin being used, thus yielding products of smaller particle size relative to products produced by a similar operation performed in the absence of resin. Notwithstanding the smaller particle size of some resin extended pigments prepared by the process of the present invention, these products are less agglomerated and more dispersible and consequently, their inherent strength and transparency is easier to realize in an end use system.

In processing of the resin extended pigments after an equilibrium particle size has been obtained, and the final acid extraction operation carried out, filtration and washing are exceptionally rapid due to the hydrophobic nature of the resin on the surface of the pigment particles affording economics in the essential pigment isolation step.

Organic pigments generally are suitable for use in the process of the present invention. Such pigments include the various copper phthalocyanines, including those polyhalogenated with chlorine and/or bromine, partially chlorinated alpha and chlorine free beta phase; alpha, beta and gamma quinacridone, as well as substituted quinacridones, such as 2,9-dimethylquinacridone, 2,9-dichloroquinacridone, 2,9-difluoroquinacridone, 4,11-dichloroquinacridone, 4,11-difluoroquinacridone and quinacridonequinone; solid solutions of two or more of the aforementioned quinacridones optionally with dihydroquinacridone such as described in U.S. Pat. No. 3,650,510; Indanthrone Blue; Flavanthrone; Thioindigo and some monoazo and disazo pigments.

The preferred quinacridones for use in the present invention have the formula:

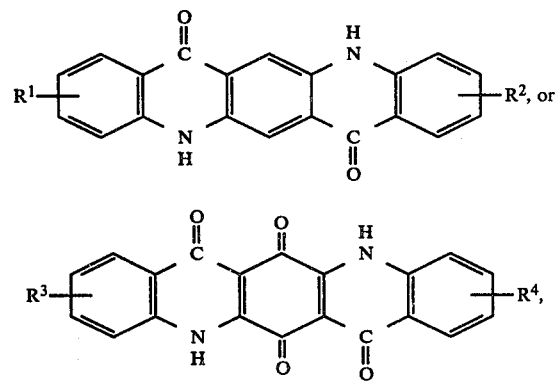

and solid solutions or mixtures, thereof with up to 15 weight percent of a quinacridone of the formula

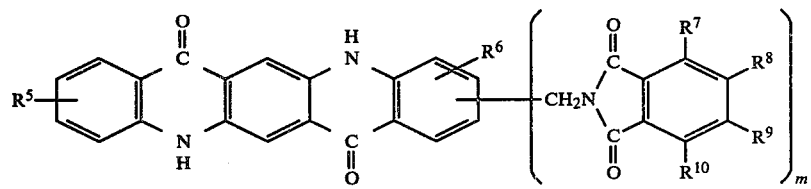

where $R^1$, $R^2$, $R^3$, $R^4$, $R^5$ and $R^6$ are hydrogen, fluorine, chlorine, bromine methyl or methoxy; $R^7$, $R^9$ and $R^{10}$ are hydrogen or chlorine and $R^8$ is hydrogen, chlorine, bromine, nitro, alkyl groups of 1-5 carbon atoms, alkoxy groups of or 2 carbon atoms or benzoylamino, and m is an integer of from 1-4.

Dispersibility in polyvinyl chloride, polyethylene or polypropylene of a 40% resin extended pigment such as copper phthalocyanine or a solid solution of 75% quinacricone and 25% 2,9-dimethylquinacridone, prepared in the presence of an organic liquid in the aqueous milling step are significantly improved over the same pigment prepared in the absence of resin, showing greater strength and intensity, but just as importantly fewer or no specks or streaks. Clearly the presence of the resin is essential for obtaining the result described above.

The resin extended pigment of the present invention also improves the heat stability of some pigments which otherwise undergo a partial or complete polymorphic change (depending on the temperature) under the influence of heat when being incorporated with plastics such as high density polyethylene. For example, the red solid solution of 75% quinacridone and 25% 2,9-dimethylquinacridone prepared by a commercial process has a definite tendency to become progressively bluer at elevated processing temperatures due to partial phase conversion of any unsubstituted quinacridone, which is not in solid solution, to the violet beta-quinacridone crystal form. In the case of the resin extended pigment prepared by the process of the present invention, this change is significantly reduced. The improved thermal stability is readily apparent by examining the polyethylene chips processed between 400° and 600° F.

EXAMPLES

In the Examples all parts are by weight.

Example 1

This example describes the preparation of a 2,9-dimethylquinacridone/quinacridone solid solution extended with a copolymer resin in the presence and absence of a solvent present as a separate phase in the aqueous surry.

A semi-works scale ball mill is charged with 1000 parts of "Cyl-Pebs", steel cylinders approximately ½ inch (0.0127 m) in diameter and ½ inch (0.0127 m) in length, 100 parts of "twenty penny" 4 inch (0.1 m) nails, 36 parts of crude 2,9-dimethylquinacridone, 4 parts crude quinacridone and 4 parts anhydrous sodium sulfate. The mill is rotated at 40 rpm which is about 74% of the critical speed ("critical speed" is the speed at which centrifugal force overcomes the force of gravity so that the grinding elements are retained against the outer wall of the unit) for 48 hours at 55°-60° C. The mill is opened and its contents discharged through a screen which retains the "Cyl-Pebs" and nails.

Then a portion of the resulting mill powder (0.029 parts) is charged into a laboratory scale ball mill along with (0.018 parts) of an ethylene/acrylic acid copolymer having a softening point of 108° C. of density of 0.93 g/cc, a Brookfield viscosity at 140° C. of 500 cps (0.5 Pa s) an acid number of 40 mg KOH/g and a solubility in n-pentanol at 25° C. of less than 1 g per liter, 1.32 parts ⅛ inch (0.0032 m) diameter steel shot, 0.20 part of water, 0.034 part of 50% aqueous sodium hydroxide and 0.0036 part n-pentanol. The mill is rotated at about 74% of its critical speed for 72 hours. The mill is discharged onto a screen which retains the steel shot. The shot is washed with water (about 0.44 part) so that essentially all of the pigment is collected as a slurry. The basic slurry is stirred and acidified with dilute sulfuric acid to neutralize the sodium hydroxide and bring the pH to about 1.4–1.5. Steam is passed through the slurry until the temperature reaches 85°±2° C. which causes the n-pentanol to steam distill off and the temperature is continued to be maintained for an hour at 85°±2° C. Then a slurry of 0.0008 part of 2-phthalimidomethyl-quinacridone in 0.01 part water is added and heating at 85°±2° C. continued for another hour. The product is isolated by filtration washed free of acid with hot water and dried at 80° C. The yield is 0.043 part of a blue shade red powder.

The product is characterized by outstanding dispersibility in polyvinyl chloride when tested in the following manner. White plasticized soft polyvinyl chloride (0.0485 part) was mixed with 0.00044 part of the resin extended pigment, prepared as above, in a small glass jar by stirring with a spatula and subsequent rolling of the jar for one minute on a roller mill. The resulting mixture is added to 0.44 part of white plasticized soft polyvinyl chloride which has been softened by milling for 30 seconds on a two roll mill, the rolls of which are preheated to 150° C. and are rotating at 15 RPM. After 15 seconds of milling, the charge is given five alternate cuts, and the material removed from the mill. The removed material is allowed to cool and small exhibits are cut from the center of the resulting sheet. The remainder of the sheet is returned to the mill for an additional 10 alternate cuts and exhibts are similarly prepared. Dispersibility is judged by degree of color development and the degree of specking and streaking in the exhibit.

In terms of dispersibility the new product is fully equal to currently available commercial 50% resin extended product produced by more elaborate post particle size processing techniques.

When the same mill powder is milled in the aqueous medium exactly as described above but without the n-pentanol and using exactly the same extraction and isolation procedure, 0.042 part of a blue shade red powder is obtained. The dispersibility of this product in polyvinyl chloride, evaluated according to the procedure described above, is significantly inferior to the product prepared in the presence of n-pentanol.

Example 2

This example describe the preparation of a 2,9-dimethylquinacridone/quinacridone solid solution pigment extended with a different copolymer resin (86%/14% polyethylene/vinyl acetate) in the presence and absence of a solvent present as a separate phase in the aqueous slurry.

Premilled powder prepared exactly as described in Example 1 and subsequently water milled in the presence of n-pentanol with ⅛ inch (0.0032 m) diameter steel shot exactly as described in Example 1, but with 0.018 part of ethylene/vinyl acetate copolymer replacing the same amount of ethylene/acrylic acid copolymer.* Otherwise the procedure is exactly the same as in Example 1. In terms of dispersibility in polyvinyl chloride, the product is superior to a product similarly prepared in the absence of n-pentanol, and is approximately equal to a commercial resin extended product produced by a more elaborate post particle size processing technique.

*Softening point 95° C.; density 0.92 g/cc; Brookfield viscosity at 140° C. of 550 cps (0.5 Pa·s); contains 14% vinyl acetate; solubility in n-pentanol less than 1 g/liter at 25° C.

Example 3

This example describes the preparation of a 2,9-dimethylquinacridone/quinacridone solid solution pigment extended with an ethylene/acrylic acid copolymer pigment in the presence of n-pentanol, a small amount of sodium hydroxide (to bring the pH to 12.5) and sodium sulfate calculated to bring the ionic strength of the aqueous phase in the aqueous milling step to the level of that described in Example 1.

Premilled powder (0.029 part) prepared exactly as described in Example 1 is milled for 72 hours in a laboratory scale ball mill containing 1.32 parts ⅛ inch (0.032 m) diameter steel shot 0.22 part of water, 0.002 part 50% aqueous sodium hydroxide, 0.018 part of the ethylene/acrylic acid copolymer used in Example 1, 0.0036 part n-pentanol and 0.0188 part of anhydrous sodium sulfate.

The contents of the mill are worked up with acidification exactly as described in Example 1. After drying, 0.043 part of a blue shade red powder is obtained.

When tested in polyvinyl chloride, the product exhibits very good dispersibility by the 5 and 15 cut vinyl dispersibility method described in Example 1 and is essentially identical to the product obtained in Example 1. If the example is repeated but the n-pentanol is left out, a significantly inferior product is obtained from the standpoint of polyvinyl chloride dispersibility.

Example 4

This example describes the preparation of a 2,9-dimethylquinacridone/quinacridone solid solution pigment extended with an ethylene/acrylic acid copolymer in the presence of o-dichlorobenzene with and without a nonionic surfactant.

Premilled powder (0.029 part), prepared exactly as described in Example 1, is milled for 72 hours in a laboratory scale ball mill, containing 1.32 parts 1/8 inch (0.0032 m) diameter steel shot, 0.20 part of water, 0.034 part of 50% aqueous sodium hydroxide, 0.018 part of the ethylene/acrylic acid copolymers used in Example 1, 0.0057 part of o-dichlorobenzene and 0.0013 part of Igepal CO-630 (a condensation product of nonylphenol and ethylene oxide). The contents of the mill are worked up with acidification exactly as described in Example 1. After drying, 0.043 part of a blue shade red powder is obtained.

When tested in polyvinyl chloride, the product exhibits excellent dispersibility with virtually no increase in tinctorial strength on going from a 5 to 15 cuts sheet processed on a 2 roll mill. In contrast, when the procedure is repeated exactly the same way, but without the Igepal, a product of significantly inferior dispersibility in polyvinyl chloride is obtained.

Example 5

This example describes the preparation of a 2,9-dimethylquinacridone/quinacridone solid solution pigment extended with an ethylene/acrylic acid copolymer in the presence of 2-pentanone.

Premilled powder (0.029 part) prepared exactly as described in Example 1 is milled for 72 hours in a laboratory scale ball mill containing 1.32 parts ⅛ inch (0.0032 m) diameter steel shot, 0.20 part of water, 0.034 part of 50% aqueous sodium hydroxide, 0.018 part of the ethylene/acrylic acid copolymer used in Example 1 and 0.0071 part 2-pentanone.

The contents of the mill are worked up with acidification exactly as described in Example 1. After drying 0.042 part of a blue shade red powder is obtained.

The product exhibits excellent dispersibility in polyvinyl chloride showing virtually the same tinctorial strength in 5 and 15 cuts sheet processed on a two roll mill, and by this test exhibits dispersibility at least as good as a commercial resin extended pigment.

Example 6

This example describes the preparation of a copper phthalocyanine pigment both with and without resin extension.

A semi-works scale ball mill is charged with 30 parts of a crude semi-chlorinated copper phthalocyanine pigment containing 4.5% by weight chlorine (obtained by the reaction of 4-chlorophthalic acid and phthalic anhydride with urea and cuprous chloride) along with 20 parts of the ethylene/acrylic acid copolymer used in Example 1. The mill has previously been charged with 1000 parts of "Cyl-Pebs" [steel cylinders approximately ½ inch (0.0127 cm) in diameter and ½ inch (0.0127 cm) in length]and 100 parts of "Twenty Penny" 4 inch (0.1 m) long nails. To suppress the explosivity of the resulting powder, 5 parts of anhydrous sodium sulfate is also added. The mill is rotated at 74% of the critical speed for 15 hours, after which the contents of the mill is discharged through a screen which retains the "Cyl-Pebs" and nails. A portion of the resulting mill powder (0.047 part) is charged with a laboratory scale ball mill containing 1.32 parts ⅛ inch (0.0032 m) diameter steel shot, 0.21 part water, 0.017 part 50% aqueous sodium hydroxide and an appropriate amount of n-pentanol. The mill is rotated at about 75% of the critical speed for 72 hours. The mill is discharged on a screen which retains the steel shot using sufficient additional water to collect all of the pigment slurry from the mill. The basic slurry is stirred and acidified with dilute sulfuric acid to neutralize the sodium hydroxide and bring the pH to about 1.4–1.5. Steam is passed through the slurry until the temperature reaches 85° C. After holding at 85°±2° C. for 2 hours, the product is isolated by filtration. It is washed acid free with hot water and dried at 80° C. The yield is 0.04 part of a dark bluish powder.

The product is characterized by outstanding dispersibility in low density polyethylene when tested in the following manner: Film grade low density polyethylene (0.386 part) is added to a two roll mill having two six inch (0.15 m) rolls which are rotated at surface speeds of 35 and 45 feet per minute (10.7 and 13.7 meters per minute), respectively and are heated to 60° C. and 120° C. respectively. When the low density polyethylene has softened, a previously prepared hand stirred mixture of 0.055 part of powdered low density polyethylene and 0.0022 part (on a toner basis) of the resin extended pigment prepared above is added and the material thoroughly incorporated by milling for 50–60 seconds. The charge is given 5 alternate cuts and the material is taken off the mill, allowed to cool and small exhibits (3 inch by 4 inch) (0.076 m by 0.1 cm) are cut from the center of the resulting sheet. The remainder of the sheet is returned to the mill for an additional 5 alternate cuts and an exhibit cut out. The same is repeated for 15 and 20 total cuts. The exhibits are separately pressed in a 3 inch by 5 inch (0.0762 m by 0.127 m), 20 mil (0.0005 m) mold at 174° C. using polyethylene terephthalate film between the low density polyethylene and the metal of the mold. The pressed material is cooled before the film is removed. The resulting exhibits are visually examined under a microscope. The pigment is completely dispersed showing no appreciable amounts of visible particles and is comparable to a commercial resin extended pigment prepared by a different post particle size processing method.

A product prepared in a similar manner, but with a pigment which has not been resin extended, shows large undispersed pigment aggregates.

The pigment can also be evaluated by determining the tinctorial strength of the pigment when dispersed in low density polyethylene. Low density polyethylene (0.44 part) is added to the two roll mill with the front roll heated to 138° C. and the rear roll to 121° C., rotating respectively at 45 and 35 feet per minute (13.7 and 10.7 meters per minute) respectively. When the low density polyethylene has softened 0.017 part of a 50/50 low density polyethylene/white titanium dioxide pigment, concentrate is added and given 5 alternate cuts to incorporate the white pigment. Then 0.00044 part (on a toner basis) of the pigment, prepared as above, is added and the material thoroughly incorporated for about one minute. Then the charge is given five alternate cuts and a center sample taken as described above followed by 10, 15 and 20 alternate cuts with a center sample being taken each time. Three inch by 5 inch (0.072 m by 0.127 m) by 20 mil (0.0005 m) exhibits are pressed in a mold and the color strength compared. The tinctorial strength exhibited by the pigment is comparable to that of a commercial resin extended pigment. When the milling step is repeated without the n-pentanol, a product is obtained which exhibits good dispersibility in polyvinyl chloride, but which exhibits slightly inferior tinctorial strength and a greater number of undispersed particles in a TiO$_2$ free film of polyethylene evaluated according to the procedures described above.

Example 7

This example describes the aqueous comilling of resin and separately premilled semichloro copper phthalocyanine.

A laboratory scale ball mill is charged with 1.32 parts ⅛ inch (0.0032 m) diameter steel shot, 0.21 part water, 0.017 part 50% aqueous sodium hydroxide, 0.026part of ethylene/acrylic acid copolymer, an appropriate amount of pentanol and 0.026 part of semichloro copper phthalocyanine premilled essentially as described in Example 6 but in the absence of resin and sodium sulfate. The mill is rotated at about 75% of the critical speed for 72 hours. The contents of the mill are discharged onto a screen which retains the steel shot, and washed with sufficient additional water to collect all of the pigment slurry from the mill.

The slurry is acidified and extracted by the procedure described in Example 6. The yield of the dark bluish powder is 0.05 part. The product exhibits outstanding dispersibility in polyvinyl chloride when tested as described in Example 1 and exhibits outstanding dispersibility in polyethylene when tested both with and without TiO$_2$ as described in Example 6. The tinctorial strength exhibited by this pigment in polyethylene is at least as great as that of a commercial resin extended pigment. When the n-pentanol is omitted from the aqueous milling step a product of significantly inferior dispersibility in polyethylene is obtained.

Example 8

This example describes the preparation of a resin extended beta quinacridone violet both with and without n-pentanol.

A laboratory scale ball mill is charged with 3.3 part of ½ inch (0.0127 m) diameter steel balls, 0.33 part roofing nails, 0.11 part crude beta quinacridone and 0.011 part of anhydrous sodium sulfate. The charge is milled by rotating the mill for 72 hours at about 74% of the critical speed, after which the contents of the mill are discharged through a screen which retains the steel balls and nails and the dry mill powder is recovered.

Another laboratory scale mill is then charged with 1.32 parts of ⅛ inch (0.0032 m) steel shot, 0.029 part of the above mill powder, 0.018 part of the ethylene/acrylic acid copolymer, used in Example 1, 0.21 part of water, 0.017 part of 50% aqueous sodium hydroxide and 0.0036 part of n-pentanol. The mill is rotated at about 75% of its critical speed for 72 hours, after which the mill is discharged through a screen which retains the steel shot and washed with sufficient water to collect essentially all of the pigment from the mill. The resulting slurry is acidified with dilute sulfuric acid to obtain a pH of 1.4–1.5. Steam is passed through the slurry until the temperature reaches 85°±2° C. After keeping the temperature for one hour at 85°±2° C., a slurry of 0.0007 part of 2-phthalimidomethylquinacridone in 0.011 part water is added and heating continued for another hour. The product is isolated by filtration, washed free of acid with hot water, and dried at 80° C. The yield is 0.043 part of a dark violet powder.

The product exhibits outstanding dispersibility in polyvinyl chloride, being bluer and at least as dispersible as a commercial product made by a different and more elaborate process.

The product exhibits vastly improved dispersibility over a product prepared in the same manner but without n-pentanol in the aqueous milling step.

Example 9

This example describes the preparation of a resin extended gamma quinacridone.

A commercial scale ball mill is charged with 20,000 parts of ½ inch diameter×1 inch steel cylinders (0.0127 m by 0.0254 m) and 2000 parts of railroad spikes, 300 parts of alum (aluminum sulfate pentadecahydrate) and 900 parts crude gamma quinacridone. The charge is milled by rotating the mill for 14 hours after which the contents of the mill are discharged through a screen which retains the steel cylinders and railroad spikes and the dry mill powder is recovered.

A laboratory scale ball mill containing 1.32 parts ⅛ inch (0.0032 m) diameter steel shot, 0.21 part of water 0.017* part of 50% aqueous sodium hydroxide, 0.018 part of the ethylene/acrylic acid copolymer used in Example 1, 0.0036 n-pentanol and 0.035 part of the above mill powder is rotated for 72 hours at about 75% of its critical speed. After separating the slurry from the steel shot, it is acidified and worked up exactly as described in Example 7. The yield is 0.043 part of a dark red powder.

*An amount of base more than sufficient to neutralize all the acidic alum contained in the mill powder.

The product exhibits excellent dispersibility in polyvinyl chloride when evaluated by the 5 and 15 cut procedure described in Example 1 and is far superior in terms of specks and streaks when compared with a commercial plastic grade gamma-quinacridone product.

The product shows a vast improvement in dispersibility vs. a pigment prepared in the identical manner but with the n-pentanol omitted from the aqueous milling step.

Example 10

This example describes the preparation of a resin extended solid solution of 60% quinacridone and 40% 4,11-dichloroquinacridone.

A laboratory scale ball mill is charged with 3.3 parts of ½ inch (0.0127 m) diameter steel balls, 0.33 part roofing nails, 0.066 part of crude gamma quinacridone, 0.044 part of crude 4,11-dichloroquinacridone and 0.011 part of anhydrous sodium sulfate. The charge is milled and the mill powder isolated as described in Example 8.

Another laboratory scale mill is then charged with 10.6 parts of ⅛ inch (0.0032 m) steel shot, 0.29 part of the above mill powder, 2.09 parts of water, 0.17 part of 50% aqueous sodium hydroxide, 0.18 part of the ethylene/acrylic acid copolymer used in Example 1 and 0.036 part of n-pentanol. The mill is rotated at about 75% of its critical speed for 72 hours after which the slurry is separated from the milling media. The slurry is acidified with dilute sulfuric acid to pH 1.4–1.5. Steam is passed through the slurry until the temperature reaches 90°±2° C. and the temperature is maintained for one hour. Then a slurry of 0.066 part of 2-phthalimidomethylquinacridone in 0.044 part water is added and the temperature maintained at 90°±2° C. for another hour. The product is isolated by filtration, washed free of acid with hot water and dried at 80° C. The yield is 0.42 part of a dark brownish scarlet powder.

The product exhibits excellent dispersibility in polyvinyl chloride and is vastly superior to a product prepared by the same procedure but in the absence of n-pentanol in the liquid milling step.

Example 11

This example describes the preparation of the solid solution described in Example 10, but with the resin included in the premilling operation. A laboratory scale ball mill is charged with 3.3 parts of ½ inch (1.27 cm) diameter steel balls, 0.33 part roofing nails, 0.066 part of crude gamma quinacridone, 0.044 part of crude 4,11-dichloroquinacridone, 0.073 part of the ethylene/acrylic acid copolymer used in Example 1 and 0.018 part anhydrous sodium sulfate The charge is milled at about 75% of the critical speed of the mill for 96 hours and the mill powder isolated as described in Example 8.

Another laboratory scale ball mill is then charged with 10.6 parts of ⅛ inch (0.0032 m) steel shot, 0.47 part of the above mill powder, 2.09 parts of water, 0.17 part of 50% aqueous sodium hydroxide and 0.036 part n-pentanol. The charge is milled at 75% of the critical speed of the mill for 72 hours, the slurry separated and processed as described in Example 10. The yield is 0.41 part of a deep dark brownish scarlet powder.

The product exhibits excellent dispersibility in polyvinyl chloride and is significantly redder and stronger than the product resin extended solid solution described in Example 10.

An X-ray diffraction pattern shows the product to be significantly smaller in particle size relative to the similar product described in Example 10. Evidently the co-milling of the two quinacridones with resin, causes some particle size growth retardation in the aqueous milling step.

Example 12

This example describes the preparation of a resin extended solid solution consisting of 75% quinacridone and 25% 2,9-dimethylquinacridone.

A laboratory scale ball mill is charged with 3.3 parts of ½ inch (0.01 m) diameter steel balls, 0.33 part of roofing nails, 0.083 part of crude gamma quinacridone, 0.028 part of crude 2,9-dimethylquinacridone and 0.011 part of anhydrous sodium sulfate. The charge is milled at about 75% of the critical speed of the mill for 96 hours and the mill powder isolated as described in Example 8.

The mill powder is then subjected to an aqueous milling in the presence of the ethylene/acrylic acid copolymer used in Example 1 and the resulting slurry processed exactly as described in Example 10. The yield is 0.43 part of a dark blue shade red powder.

The product exhibits excellent dispersibility in polyvinyl chloride. The 5 and 15 cut vinyl sheets show essentially the same strength and are virtually devoid of any streaks or specks and the dispersibility is vastly superior to a product prepared by the same procedure, but in the absence of n-pentanol in the liquid milling step.

When evaluated in high density polyethylene for heat stability the product (prepared by the same process on a smaller scale) shows not only excellent color intensity, but a vast improvement in heat stability over the range of 400°-600° F. vs. a commercial product of similar pigment composition prepared by another process without resin extension.

When the procedure of Example 11 is followed and the two solid solution partners are premilled (i.e. dry milled) with the copolymer and the subsequent aqueous milling carried out as described in Example 11 a product of similar performance characteristic in polyvinyl chloride to the product described in this example is obtained.

I claim:

1. A process comprising converting a crude organic pigment into a highly aggregated pigment product of low crystallinity followed by milling the thus obtained product in the presence of from 10-75% by weight based on the amount of pigment of a water-insoluble thermoplastic resin, water having a pH of from 7-14 occupying essentially all of the voids below the level of the grinding elements in the mill and up to 25% by weight, based on pigment, of an organic liquid which does not exert solubilizing action on the resin and which is present as a separate phase from the water, in an amount which is effective in improving the crystallinity of the pigment particles.

2. The process of claim 1 wherein there is present in the water milling step from 5-25% by weight, based on pigment of a separate phase comprising an organic liquid which is effective in wetting the resin and improving the crystallinity of the pigment particles and recovering a resin extended pigmentary grade product.

3. The process of claim 2 wherein the water has a pH of 9-13.5.

4. The process of claim 3 wherein the pigment is quinacridone or a derivative thereof or a solid solution of two or more quinacridones or quinacridone derivates or copper phthalocyanine, or a partially or completely halogenated copper phthalocyanine.

5. The process of claim 4 wherein the resin is a polymer of ethylene containing up to 25% of a monomer selected from the class consisting of acrylic acid, methacrylic acid, vinyl acetate and oxidized ethylene units.

6. The process of claim 5 wherein the resin has a softening point of from 80°-140° C. as determined by ASTM E-28.

7. The process of claim 6 wherein the highly aggregated pigment product of low crystallinity is obtained by dry milling.

8. The process of claim 7 wherein the pigment is quinacridone or a derivative thereof or a solid solution of two or more quinacridones or quinacridone derivatives or copper phthalocyanine or a partially or completely halogenated copper phthalocyanine.

9. The process of claim 8 wherein the resin is a polymer of ethylene containing up to 25% of a monomer selected from the class consisting of acrylic acid, methacrylic acid, vinyl acetate and oxidized ethylene units.

10. The process of claim 9 wherein the resin has a softening point of from 80°-140° C. as determined by ASTM E-28.

11. The process of claim 10 wherein the organic liquid is selected from alcohols having from 4-8 carbon atoms, ketones having from 5-8 carbon atoms, and, in the presence of a surfactant, halogenated aliphatic or aromatic compounds having from 2-8 carbon atoms.

12. The process of claim 11 wherein the organic liquid is pentanol.

13. The process of claim 11 wherein the pigment is copper phthalocyanine or a halogenated copper phthalocyanine.

14. The process of claim 11 wherein the pigment consists essentially of a quinacridone or quinacridone of the formula

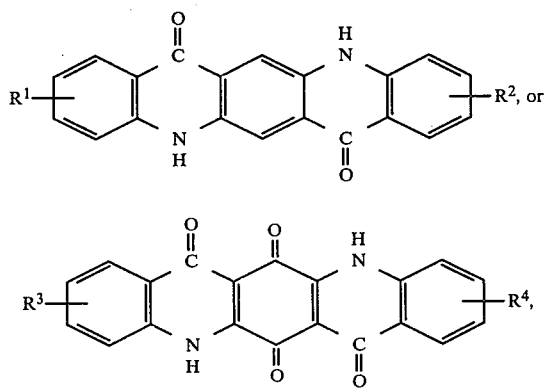

and solid solutions or mixtures thereof, and up to 15 weight percent of a quinacridone of the formula

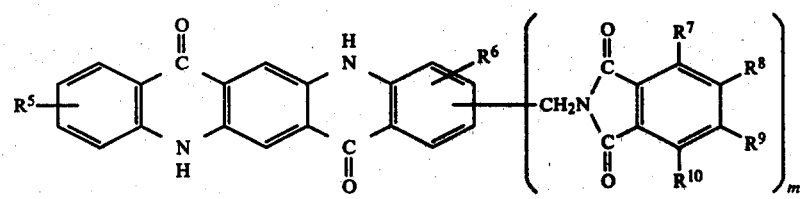

where $R^1$, $R^2$, $R^3$, $R^4$, $R^5$ and $R^6$ are hydrogen, fluorine, chlorine, bromine methyl or methoxy; $R^7$, $R^9$ and $R^{10}$ are hydrogen or chlorine and $R^8$ is hydrogen, chlorine, bromine, nitro, alkyl groups of 1–5 carbon atoms, alkoxy groups of or 2 carbon atoms or benzoylamino, and m is an integer of from 1–4.

15. The process of claim 14 wherein the organic liquid is pentanol.

16. The process of claim 15 wherein the quinacridone consists essentially of 2,9-dimethylquinacridone and up to 5% by weight phthalimidomethylquinacridone.

17. The process of claim 15 wherein the quinacridone is a solid solution consisting essentially of 2,9-dimethylquinacridone, quinacridone, and up to 5% by weight phthalimidomethylquinacridone.

18. The process of claim 15 wherein the quinacridone consists essentially of β-quinacridone and up to 5% by weight phthalimidomethylquinacridone.

19. The process of claim 15 wherein the quinacridone consists essentially of γ-quinacridone and up to 5% by weight phthalimidomethylquinacridone.

20. The process of claim 15 wherein the quinacridone is a solid solution consisting essentially of 4,11-dichloroquinacridone, quinacridone and up to 5% phthalimidomethylquinacridone.

* * * * *